UNITED STATES PATENT OFFICE.

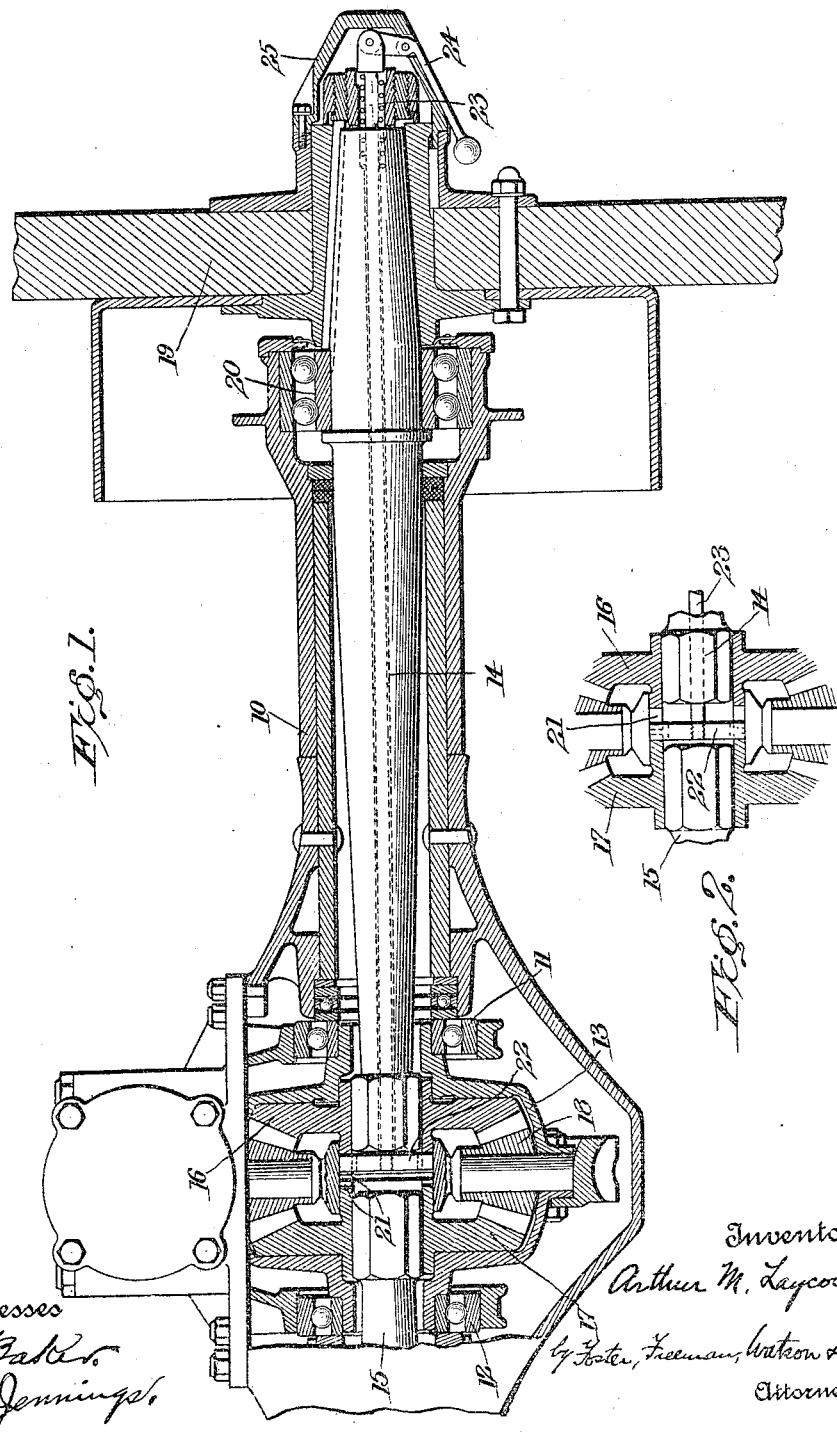

ARTHUR M. LAYCOCK, OF KINGSTON, PENNSYLVANIA.

DIFFERENTIAL-GEAR LOCK.

1,210,497.     Specification of Letters Patent.     Patented Jan. 2, 1917.

Application filed December 4, 1915. Serial No. 65,097.

*To all whom it may concern:*

Be it known that I, ARTHUR M. LAYCOCK, subject of the King of Great Britain, residing at Kingston, Luzerne county, State of Pennsylvania, have invented certain new and useful Improvements in Differential-Gear Locks, of which the following is a specification.

This invention relates to driving axles for vehicles and more particularly to axles provided with differential mechanism.

It is the object of the invention to provide a simple and convenient device for locking the differential so as to render it inoperative.

The invention is illustrated in the accompanying drawings in which:—

Figure 1 is a longitudinal section through a portion of a vehicle axle, and Fig. 2 is a detail showing certain parts in a different position than in Fig. 1.

Referring to the drawings, 10 indicates the axle tube or housing in which there is rotatably mounted in the bearings 11 and 12 a differential gearing 13. The live or driving shafts 14 and 15 of the axle are suitably keyed to the gears 16 and 17 respectively with which the small differential pinions 18 mesh. At the outer end of the shaft 14 is the road wheel 19 which is shown as mounted upon and secured to the shaft 14. It will be understood that the shaft 15 has a similar wheel at its outer end. The shaft 14 has its outer end supported in a bearing 20 in the housing 10. The adjoining ends of the hubs of the gears 16 and 17 are provided with corresponding clutch surfaces 21. These surfaces may be formed by slotting the ends of the hubs and in order to lock the gears together to render the differential inoperative a connecting member 22 may be provided, this member being shown as slidable in the slots forming the surfaces 21 and in Fig. 2 it is shown as bridging the space between the ends of the hubs and forming a connection between them. In Fig. 1 the member 22 is shown as disconnected from the gear 17 and when in this position the differential operates in the usual way. A rod 23 is slidably arranged in the shaft 14 and connected with the member 22. The outer end of the rod is pivotally connected with the lever 24 which is mounted on the hub cap 25 of the wheel, this hub cap surrounding and inclosing the outer end of the shaft 14.

As will be seen from Fig. 1 the actuation of the lever 24 will move the rod 23 longitudinally of the shaft 14 and actuate the member 22 to connect or disconnect the gears 16 and 17. When the gears are rigidly connected together by the member 22, the wheels at the ends of the shafts 14 and 15 rotate together and cannot have any differential movement. This is sometimes an advantage under certain road conditions and while ordinarily the differential mechanism will be used, it is of great advantage to be able to render the differential inoperative whenever the conditions make this desirable. The provision of the lever 24 on the hub cap renders the operation of the locking device very simple and convenient.

Having thus described my invention, what I claim is:

1. In a driving axle, the combination of two independent shafts for driving the wheels at the opposite ends of the axle, gears keyed to the inner ends of said shafts and provided with opposed clutch surfaces, a connecting member adapted to coöperate with said opposed clutch surfaces to lock said gears and shafts together, a rod secured to said member and slidably arranged in one of said shafts, and means at the outer end of the last mentioned shaft for actuating said rod and member.

2. In a driving axle, the combination of two independent shafts, wheels at the ends of said shafts and driven thereby, hub caps secured to said wheels, gears keyed to inner ends of said shafts and provided with opposed clutch surfaces, a connecting member adapted to coöperate with said opposed clutch surfaces to lock said gears and shafts together, a rod secured to said member and slidably arranged in one of said shafts and projecting from the outer end thereof, and a lever connected with the outer end of said rod and pivoted to the surrounding hub cap and adapted to be actuated from the exterior of the hub cap to move said member.

In testimony whereof I affix my signature.

ARTHUR M. LAYCOCK.

Copies of this patent may be obtained for five cents each, by addressing the "Commissioner of Patents, Washington, D. C."